United States Patent [19]
Cobb et al.

[11] Patent Number: 5,828,481
[45] Date of Patent: Oct. 27, 1998

[54] MID-OBJECTIVE LASER SCANNER

[75] Inventors: Joshua Monroe Cobb, Millbrook, N.Y.; Candace Joy Flattery-Freedenberg, Sneads Ferry, N.C.; Franz X. Topolovec, Accord; Uldis Artis Ziemins, Poughkeepsie, both of N.Y.

[73] Assignee: International Business Machines Corporation, Armonk, N.Y.

[21] Appl. No.: 462,979

[22] Filed: Jun. 5, 1995

Related U.S. Application Data

[62] Division of Ser. No. 250,890, May 31, 1994, abandoned.

[51] Int. Cl.$^6$ .................................. G02B 26/08; B41J 2/47
[52] U.S. Cl. ......................... 359/208; 359/207; 359/206; 359/205; 359/210; 347/256; 347/258
[58] Field of Search ...................... 359/206, 207, 359/208, 209, 210, 217, 197, 212; 347/256, 258, 261

[56] References Cited

U.S. PATENT DOCUMENTS

| | | | |
|---|---|---|---|
| 4,588,269 | 5/1986 | Kessler | 359/858 |
| 5,255,113 | 10/1993 | Yoshikawa et al. | 359/207 |
| 5,504,613 | 4/1996 | Itabashi et al. | 359/210 |

*Primary Examiner*—Paul M. Dziarzynski
*Assistant Examiner*—Audrey Chang
*Attorney, Agent, or Firm*—Aziz M. Ahsan

[57] ABSTRACT

A Mid-Objective scanner system for correcting astigmatism, bow distortion and field curvature including a tilted lens or a toric lens for producing an opposite amount of astigmatism to correct astigmatism, a scanning mechanism and a concave cylindrical mirror for directing the scanned beam onto to a workpiece wherein the concave cylindrical mirror has a radius of curvature that corrects the field of curvature in the image plane of the workpiece and thereby enables the scanner system to correct astigmatism, bow distortion and field curvature.

19 Claims, 7 Drawing Sheets

MID-OBJECTIVE LASER SCANNER

CROSS-REFERENCE TO RELATED PATENT APPLICATION

This Patent Application is a Divisional Patent Application of U.S. patent application Ser. No. 08/250,890, filed on May 31, 1994, now abandoned.

FIELD OF THE INVENTION

The present invention relates generally to a new method and apparatus to correct astigmatism, bow distortion and field curvature, and more particularly to an astigmatically corrected catadioptric laser scanner or a Mid-Objective Laser Scanner.

BACKGROUND OF THE INVENTION

Scanning systems using lasers are used in many applications. Laser scanners are part of a growing multi-billion dollar industry. For example, laser light could be scanned to drill holes in a semiconductor substrate to create microcircuitry, or it could be used to scribe alpha-numerics on a part or be used to read bar codes or used in laser printers, just to name a few.

The laser scanning systems can be basically classified into three types: Objective Scanners, Pre-Objective Scanners, and Post-Objective Scanners.

Objective Scanners 19, as shown in FIGS. 1A and 1B, are the types of scanners which use a simple lens 10, to focus a beam of light 25, such as a laser beam 25, onto a work piece or a part 12. The focused laser beam 25, is then scanned over the part 12, by either moving the lens 10, as shown in FIG. 1A, or moving the part 12, as shown in FIG. 1B. A major advantage of Objective Scanners is that the optics are less complex. While, major disadvantages of Objective Scanners are their slower scan speeds and requirements of complex strategies to move the lens or the part.

Pre-Objective Scanner 29, as shown in FIG. 2, are the types of scanners that have a moving, mirrored surface 22, typically a galvanometer or a rotating mirrored polygon, which reflects the laser beam 25, into a lens 20. The lens 20, then focuses the laser beam 25, onto a part 12, at location 23. When the mirrored surface changes its angle, mirrored surface 22', directs the laser beam 25, at a different angle into the lens 20. The lens 20, then focuses the beam 25, to another point 27, on the part 12, as can be clearly seen in FIG. 2. Generally, the lenses 20, in a Pre-Objective scanning system 29, are complex and expensive. Major advantages of Pre-Objective Scanners 29, are their high scan speeds and their ability to have a flat field image. However, the major disadvantages of Pre-Objective Scanners 29, are that the lenses are very complex, the lenses are not telecentric (a telecentric lens allows the center of the scanned beam of light to impinge the work surface orthogonally throughout the scan) unless the lens is very large, the system is complex, color correction is very difficult and all these features make the system very expensive.

Post-Objective Scanners 39, as shown in FIGS. 3A (side view) and 3B (top view), are the types of scanners that have a moving mirrored surface 22, usually a galvanometer or a rotating mirrored polygon, after a focusing objective lens 30. The light or laser beam 25, after passing through a lens will also be referred to as light or laser beam 125. The laser beam 25, first passes through the lens 30, which starts to bring the laser beam 125, to a focus. The laser beam 125, is interrupted and reflected by the galvanometer or the mirrored surface 22, to focus on the surface of the part 12, at point 35. When the scanning mechanism changes its angle it redirects the focus of the beam 125, as illustrated in FIG. 3A, to either spot 33 or 37, on an imaginary curve or arc 31. The beam 125, is perfectly focused on the arc 31, but it is out of focus at points or spots 34 and 38, on the flat surface 32, of the work piece or part 12. For the Post-Objective Scanner 39, in FIG. 3A, the laser beam 125, is folded by the galvanometer 22, 90 degrees in the X-Y plane, so that the laser beam focuses at point 35. When the galvanometer 22, scans the beam 125, it rotates about an axis 135, which lies in the center of the focusing beam 125, on the surface of the galvanometer 22, and in the direction of the Z-axis. The galvanometer 22, moves so that it intersects the laser beam 125, at an angle which is not 90 degrees in the X-Y plane. This causes the focused beam to scan along the arc 31. FIG. 3B, shows this Post-Objective Scanner 39, from a view that looks down on the scanned arc 31. Although the scanned arc 31, is out of focus at the edge of the scan it travels a straight path in the X-Z plane. Generally, the lenses 30, in a Post-Objective scanning system 39, are simple and inexpensive. Major advantages of Post-Objective scanners are their scan speeds, simplicity of the objective lens, color correctability and their ability to be designed for more wavelengths. Major disadvantages include the fact that the image field is out of focus at the edges of the scanned field or not in focus throughout the scanned distance.

This invention is basically an improvement of the Post-Objective Scanner type and it is a fourth type of a laser scanning system which will now be referred to as Mid-Objective Scanner.

PURPOSES AND SUMMARY OF THE INVENTION

The invention is a novel method and an apparatus for a new astigmatically corrected catadioptric laser scanner.

Therefore, one purpose of this invention is to provide an apparatus and a method that will provide an astigmatically corrected catadioptric laser scanner.

Another purpose of this invention is to provide a means for minimizing bow distortion, astigmatism, and field curvature resulting from a Post-Objective Scanner system.

Still another purpose of this invention is to have a scanner system that uses very inexpensive lenses and mirrors.

Yet another purpose of this invention is to provide a beam that is telecentric, i.e., the center of the focusing beam is perpendicular to the part at all points along the scan.

Still yet another purpose of the invention is to provide an optical system which is inexpensively adaptable to different wavelengths of light.

Yet another purpose of this invention is to provide an optical scanning system in which the length of the scanned line is directly proportional to the angular change of the moving mirrored surface. This is the result that is sought for a so-called F-theta lens.

Therefore, in one aspect this invention comprises a method for correcting astigmatism, bow distortion and field curvature comprising:

(a) at least one lens tilted at an angle alpha for focusing at least one incoming light beam onto at least one workpiece, (b) at least one scanning mechanism for interrupting and scanning said at least one incoming light beam, (c) said at least one scanning mechanism further directing said at least one incoming light beam onto at least a portion of the reflective surface of a concave cylindrical mirror, and (d) wherein said concave cylindrical mirror directing said at least one incoming light beam onto said workpiece, such that said at least one incoming light beam is focused at said workpiece.

In another aspect this invention comprises an apparatus for correcting astigmatism, bow distortion and field curvature comprising:

(a) at least one means for tilting at least one lens alpha degrees to focus at least one incoming light beam onto at least one workpiece, (b) a scanning mechanism located between said at least one tilted lens and said at least one workpiece, wherein said scanning mechanism has at least one means for directing said at least one incoming light beam onto at least a portion of the reflective surface of a concave cylindrical mirror, and (c) a means in said concave cylindrical mirror for directing said at least one incoming light beam onto a workpiece, such that said at least one incoming light beam is focused at said workpiece.

In yet another aspect this invention comprises an apparatus for correcting astigmatism, bow distortion and field curvature comprising:

(a) at least one toric lens to focus at least one incoming light beam onto at least one workpiece, (b) a scanning mechanism located between said at least one toric lens and said at least one workpiece, wherein said scanning mechanism has at least one means for directing said at least one incoming light beam onto at least a portion of the reflective surface of a concave cylindrical mirror, and (c) a means in said concave cylindrical mirror for directing said at least one incoming light beam onto a workpiece, such that said at least one incoming light beam is focused at said workpiece.

In still yet another aspect this invention comprises a method for correcting astigmatism, bow distortion and field curvature comprising:

(a) at least one toric lens for focusing at least one incoming light beam onto at least one workpiece, (b) at least one scanning mechanism for interrupting and scanning said at least one incoming light beam, (c) said at least one scanning mechanism further directing said at least one incoming light beam onto at least a portion of the reflective surface of a concave cylindrical mirror, and (d) wherein said concave cylindrical mirror directing said at least one incoming light beam onto said workpiece, such that said at least one incoming light beam is focused at said workpiece.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1A:
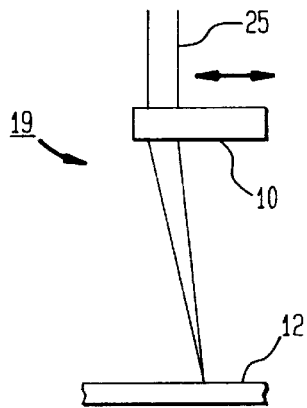
FIGS. 1A and 1B, illustrate two typical prior art Objective Scanners.
Figure 1B:
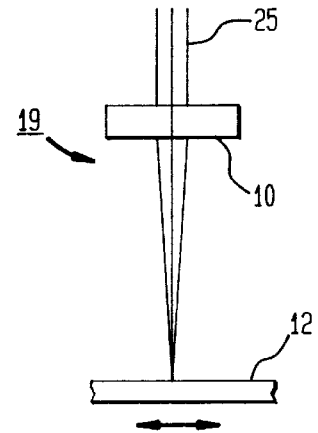
Figure 2:
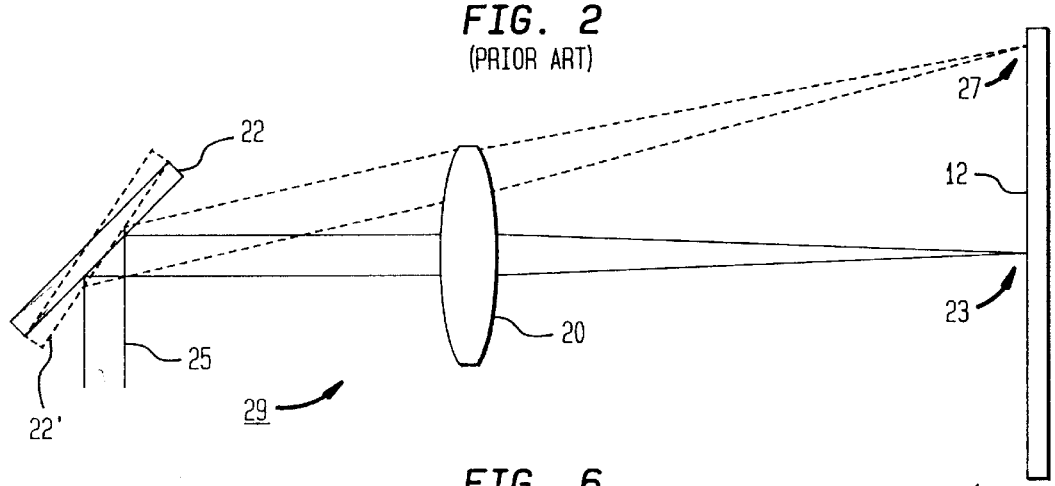
FIG. 2, illustrates a typical prior art Pre-Objective Scanner.

This invention relates more particularly to an astigmatically corrected catadioptric laser scanner or a Mid-Objective Laser Scanner system. A catadioptric system is a system that uses both reflection and refraction to achieve its focal power. While the relative powers of the lenses and mirrors vary from system to system, the use of the reflective surfaces to achieve most of the power, in combination with refractive surfaces of little or zero power, produces an image that has improved aberrational characteristics.

A lens as used herein means a single lens element or a plurality of lens elements.

This invention may also utilize a lens that is achromatic so that multiple colors of light or multiple wavelengths of light could be used in the inventive Mid-Objective scanning system.

Referring back to FIGS. 3A and 3B, when a Post-Objective Scanner 39, scans the focused laser spot 35, on an imaginary line or curve 31, it swings the focus point or spot 35, in an arc or curve 31, which has a radius of curvature, which radius of curvature is exactly the same distance from the center of the galvanometer 22, to the focus point 35, as shown in FIGS. 3A and 3B. This creates a deviation from a flat image plane which is called field curvature 36. Field curvature 36, is the distance between the arc 31, and the flat surface 32, of the part 12. As can be clearly seen in FIGS. 3A and 3B, the arc 31, is completely focused at point 35, however when the beam 125, is scanned in either direction to spot 33 or 37, beam 125, goes out of focus on the flat surface 32, of the part 12, as can be seen at point 34 and 38, respectively, on the part 12. A perfect scan would be if the focused spot 35, followed a straight scan line or the flat surface 32, on the part 12, to properly scan the part 12.

Figure 4:
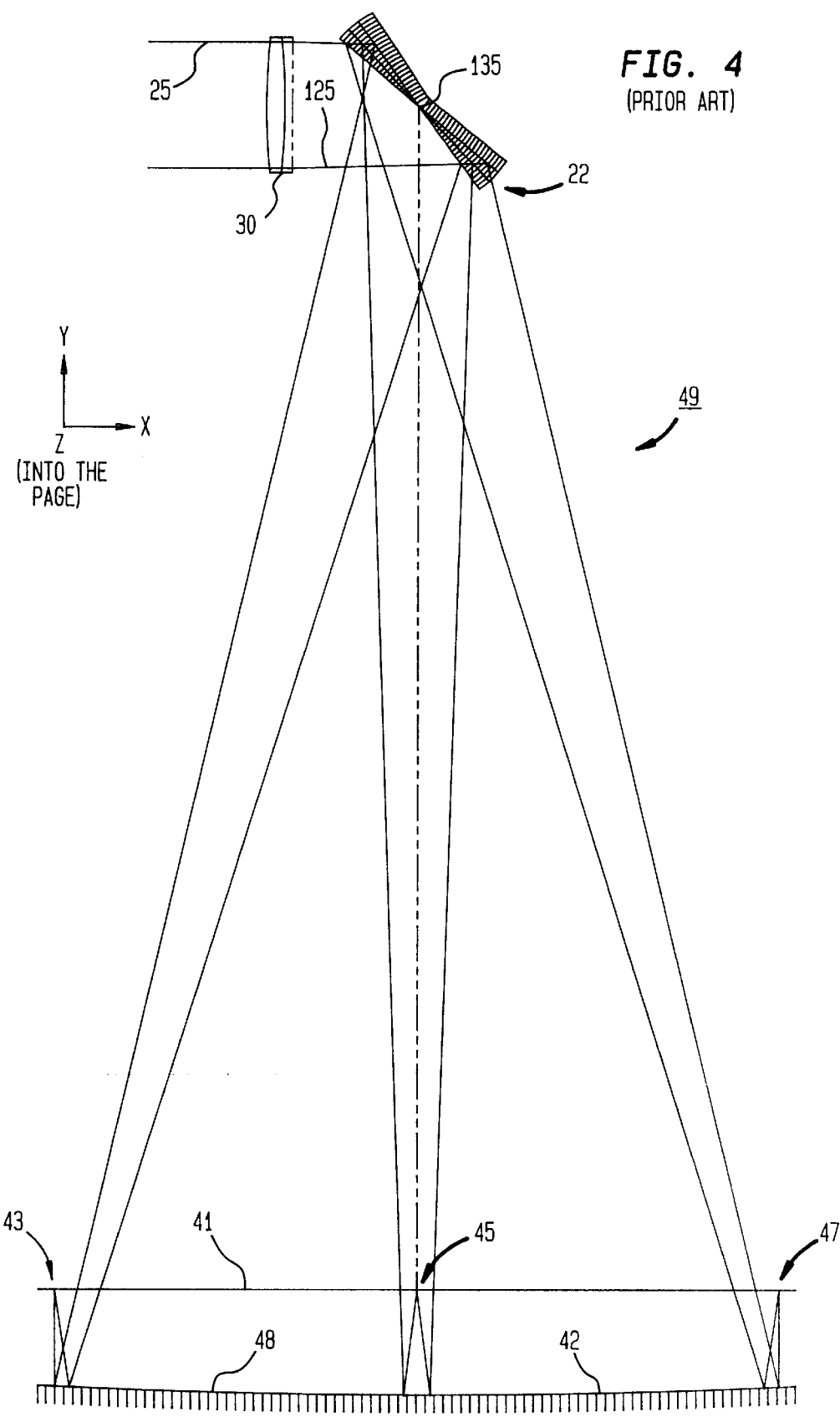
FIG. 4, illustrates a method to correct the field curvature of the prior art Post-Objective Scanner as shown in FIGS. 3A and 3B.

This field curvature 36, can be corrected using a Post-Objective Scanner 49, as shown in FIG. 4, by reflecting the scanned beam 125, off of a curved mirror 42, having a correct radius of curvature 48, as shown in FIG. 4. This creates a straight scan line or a flat image field 41, and as one can clearly see that focused points 43, 45 and 47, all are focusing on the imaginary image plane or field 41. However, this flat image plane 41, is not physically accessible because the part 12, must lie between the laser source and the curved mirror 42, and for most applications the laser beam 125, cannot generally pass through the part 12.

Figure 5A:
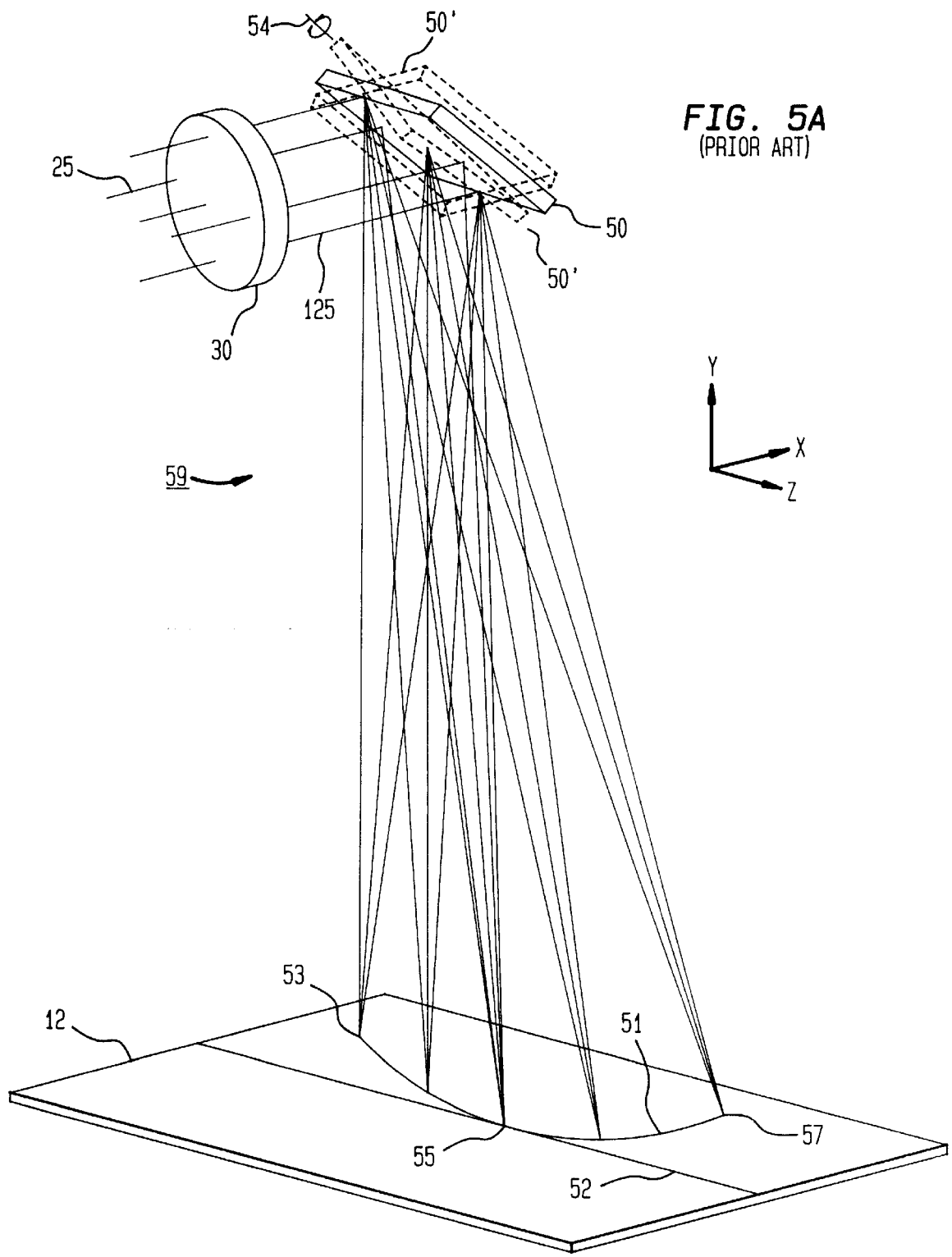
FIG. 5A, illustrates field curvature and bow distortion induced by typical prior art Post-Objective Scanners.

As shown in FIGS. 5A (side view) and 5B (top view), when a Post-Objective Scanner 59, having a moving mirrored surface 50, 50', redirects the laser beam 125, at an angle of 90 degrees in the X-Y plane, but then scans the focused spot by rotating the galvanometer 50, about an axis 54. The path that the scanned spot takes 51, is not only curved out of focus from the flat part or work-piece 12, but is also curved away from the straight line 52. This deviation of the actual scan path from a straight line is called bow distortion. This bow distortion can be clearly seen in FIG.

Figure 3A:
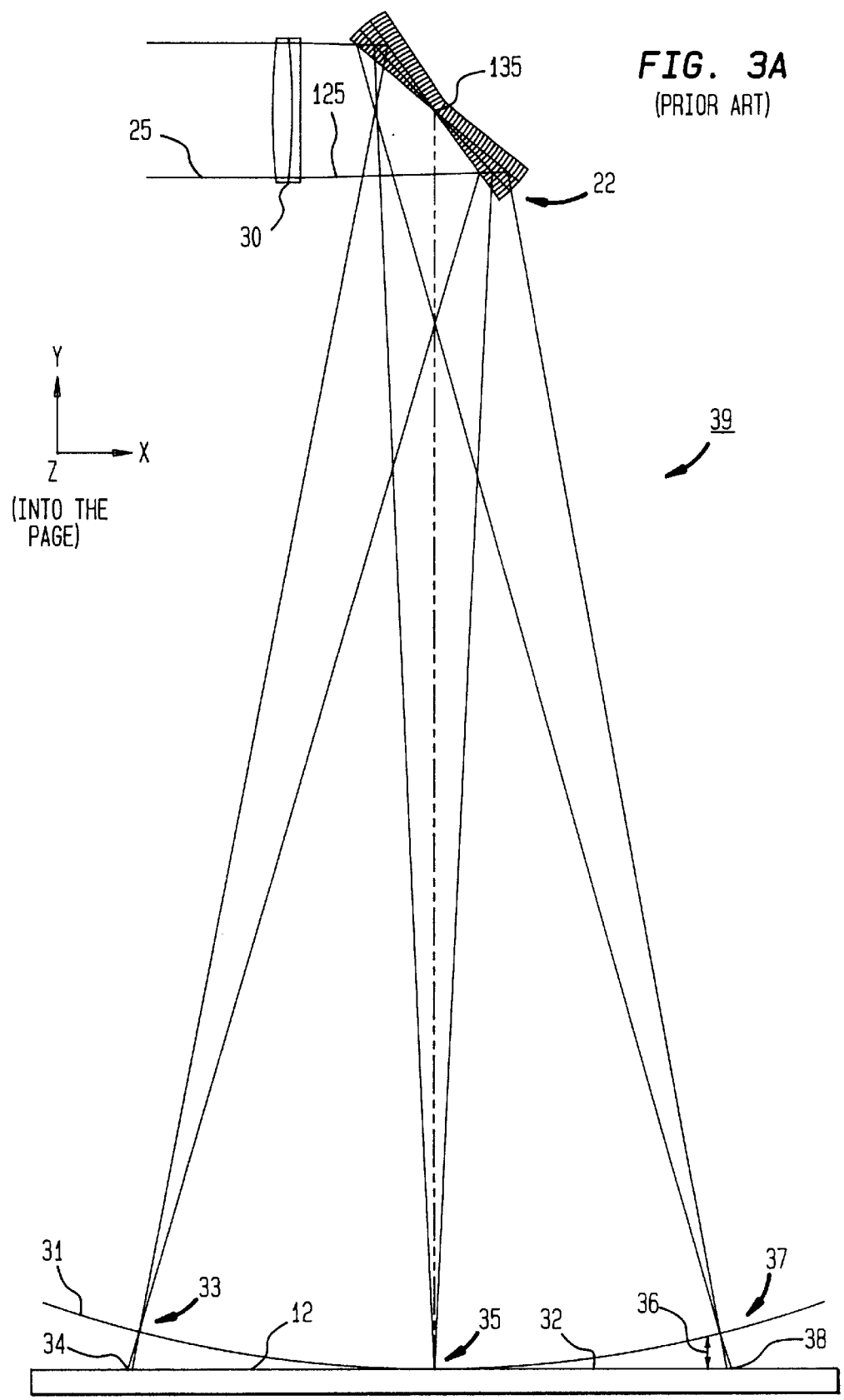
FIGS. 3A and 3B, illustrate the side view and top view respectively of a typical prior art Post-Objective Scanner.
Figure 3B:
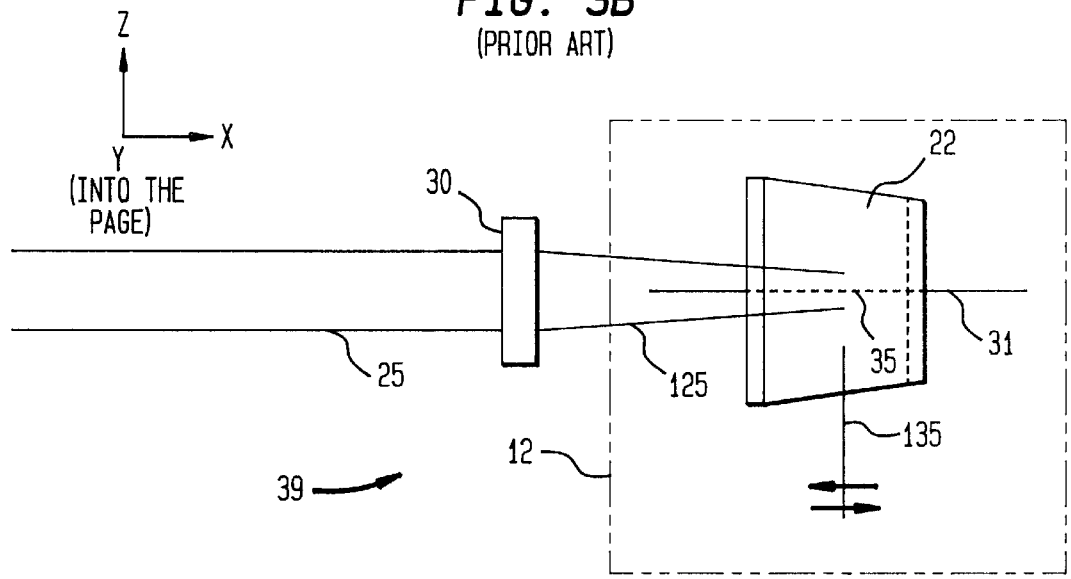
Figure 5B:
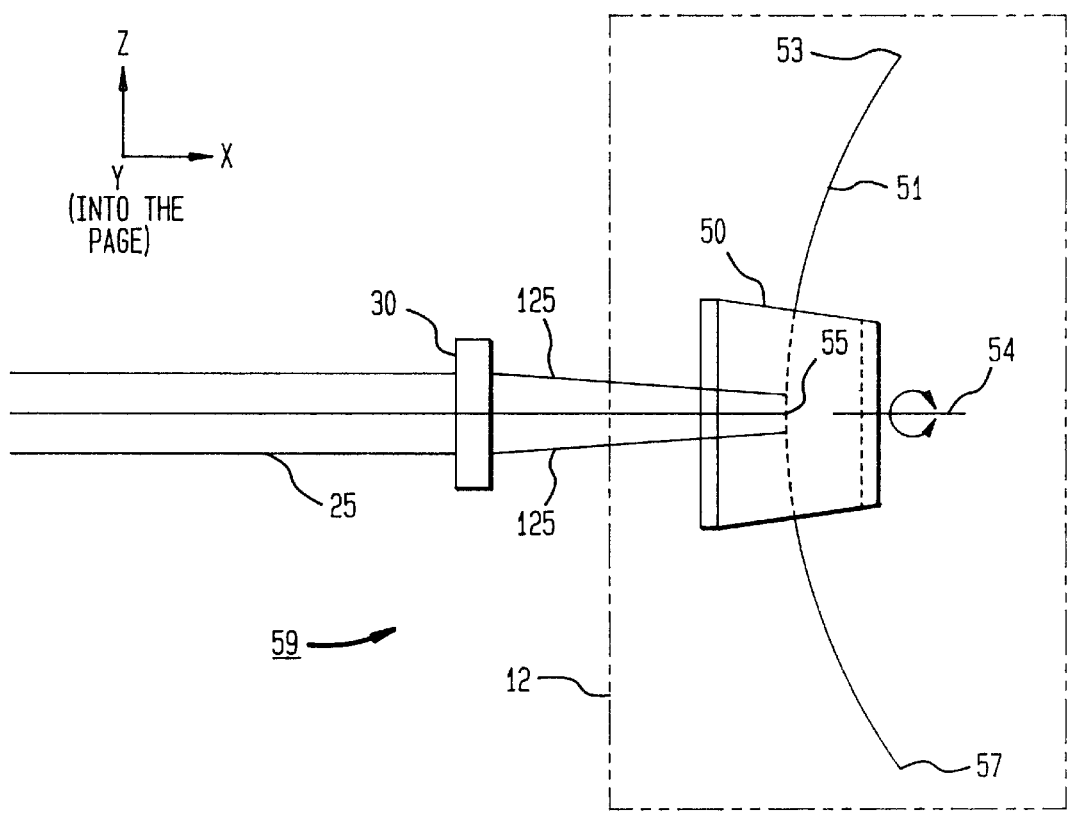
FIG. 5B, illustrates the top view of the Post-Objective scanning system of FIG. 5A, in the X-Z plane.

5B, which is a view of the scanning system 59, as seen by looking directly at the work surface 12, through the galvanometer 50. The locus of focused spots not only lies on a curved surface in the X-Y plane (i.e., producing field curvature) the scanned line is curved in the X-Z plane (i.e., producing bow distortion). It should be noted that this bow distortion is not created when the galvanometer scans the focused spot or point in the X-Y plane as shown in FIGS. 3A and 3B.

However, one way to correct this bow distortion has been discussed in a paper by Victor J. Doherty of Eidolon Corporation, entitled "Correction Scheme for a Post-Objective Optical Scanner", Society of Photo-Optical Instrumentation Engineers, International Lens Design Conference, Vol. 554, Pages 247–251 (1985). In his scheme he discusses the use of a spherical mirror similar to that of 42, shown in FIG. 4, but he tilts it at a 45 degree angle to make the image plane accessible. However, this correction adds an aberration to the image called astigmatism.

Figure 6:
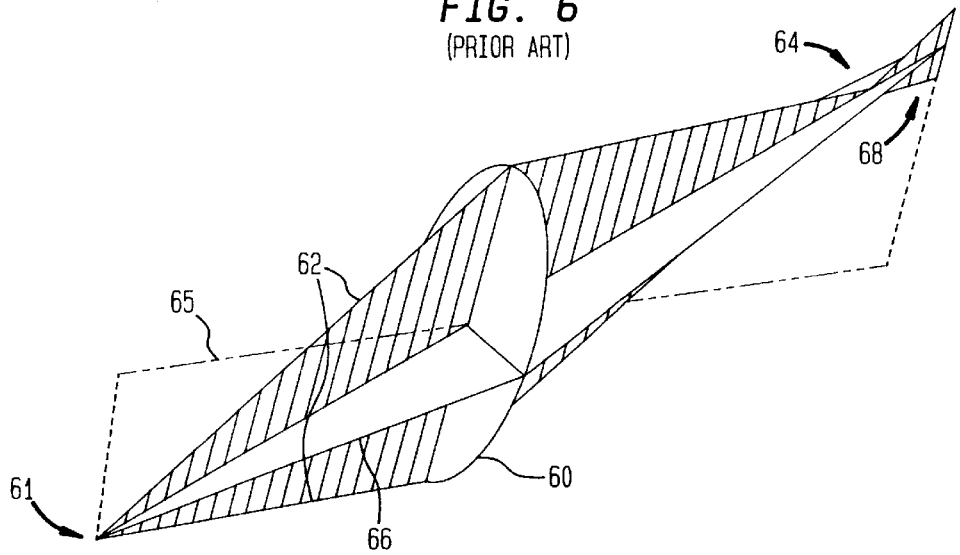
FIG. 6, illustrates astigmatism induced by a lens.

A typical example of astigmatism induced by a lens is illustrated in FIG. 6, where the lens aberration results in the tangential and sagittal image planes being separated axially, or where one axis of the focusing light beam comes to focus before the other axis. As shown in FIG. 6, in an optical system 60, having an object point 61, and optical axis 65, tangential fan of rays 62, come in focus at the tangential image or focal line 64, while the sagittal fan of rays 66, come in focus at the sagittal image or focal line 68.

In the Eidolon correction scheme the correction of the two aberrations was attempted by making the mirror toroidal, similar to that of mirror 42, as shown in FIG. 4, instead of spherical, i.e., the folding mirror has different spherical curvatures in each axis. It has been seen that the toroidal mirror does not correct all of the bow distortion in the system, and it also does not correct all of the astigmatism. The Eidolon correction scheme basically offers a compromise between the correction of the two aberrations, i.e., one due to the bow distortion and the other due to astigmatism.

However, the inventors of this invention have discovered a new method and apparatus to correct both the astigmatism and the bow distortion and also the field curvature.

Figure 7:
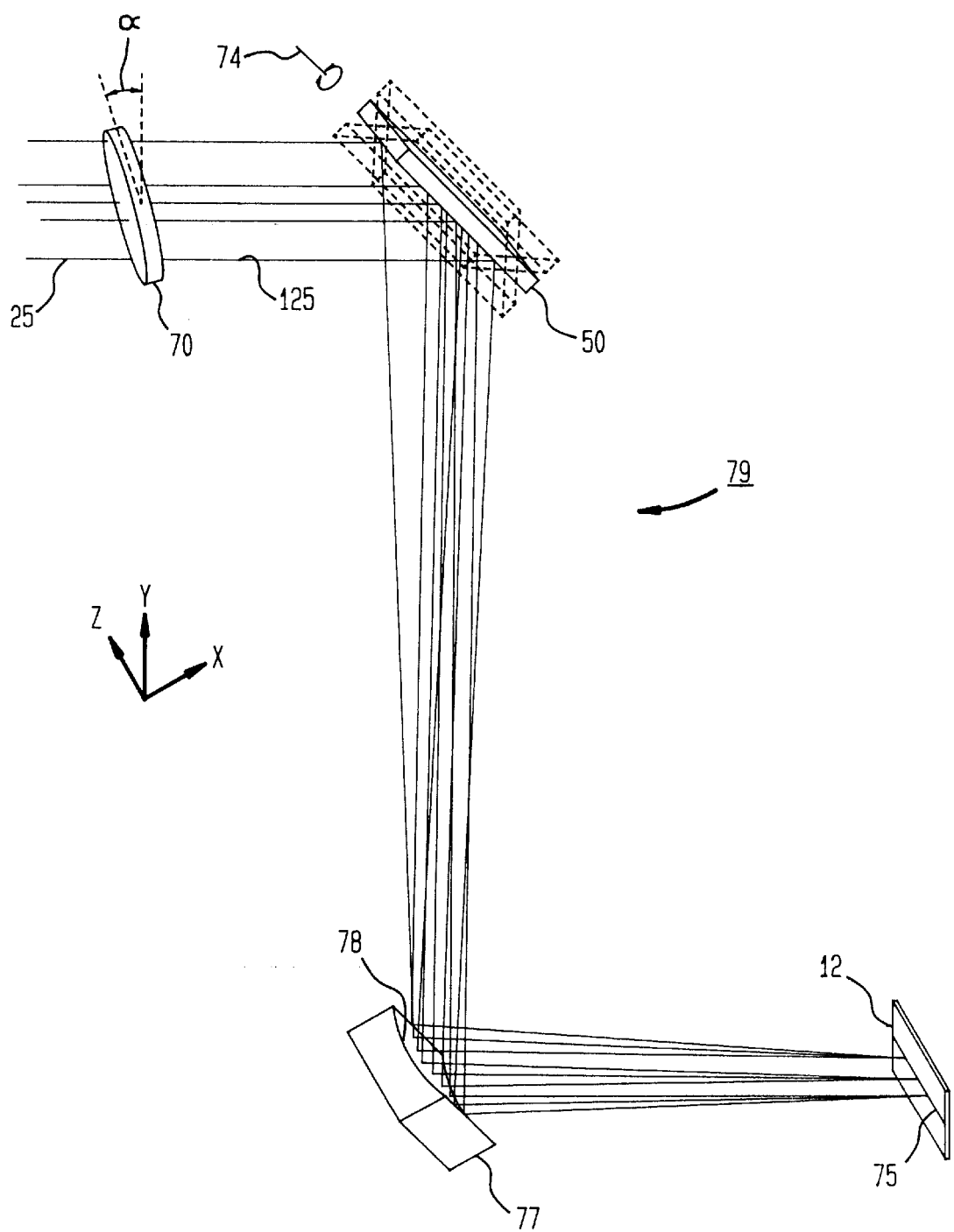
FIG. 7, illustrates a preferred embodiment of the invention.

The preferred embodiment of the invention is a Mid-Objective Scanner system 79, as shown in FIG. 7, which uses a simple refractive objective 70, which is at an angle α, to begin to bring an incident laser beam 25, to focus. The beam 125, is interrupted by a scanning mechanism 50, such as a galvanometer or a rotating mirrored polygon, and is reflected 90 degrees by it in the X-Y plane. The galvanometer 50, scans the laser beam 125, by rotating about an axis 74.

Before the laser 125, comes to focus, the center of the laser beam in the center of the scan is again folded 90 degrees by a concave cylindrical mirror 77, having a radius of curvature 78, in the same plane that the galvanometer 50, folded the beam before, but it is folded in such a way as to redirect the laser 125, in the same propagation direction it had before it was folded by the galvanometer 50. The curvature of the concave cylindrical mirror 77, is typically tilted at a 45 degree angle in the X-Z plane, and is of a radius of curvature 78, that corrects the field curvature in the image plane 75.

By folding the beam 125, again in this way, bow distortion is again added to the system, but it is opposite to that of the bow distortion added by the galvanometer 50. Thus, the bow distortion cancels itself out and the image is free of it.

After the bow distortion has been corrected the only degrading aberration left in the system is the astigmatism. This astigmatism is taken out of the image by adding the opposite amount of astigmatism in the first, simple, refractive objective 70. This is accomplished by tilting the lens 70, at an angle α, in the plane that the laser 125, is being folded (the X-Y plane) as shown more clearly in FIG. 7.

The amount or angle of the tilt α, is dependent upon several factors, such as, (a) the resolution of the system, measured by the numerical aperture, (b) the working distance from the reflective surface of the concave cylindrical mirror 77, to the work piece 12, (c) the distance between the moving mirrored surface 50, and the reflective surface of the concave cylindrical mirror 77, (d) the distance between the lens 70, and the moving mirrored surface 50, and (e) the focal length of the lens or the refractive objective 70, that is used, to name a few.

Similarly, the radius of curvature 78, for the concave cylindrical mirror 77, depends on factors, such as, (a) the distance between the lens 70, and the moving mirrored surface 50, (b) the distance between the moving mirrored surface 50, and the reflective surface of the concave cylindrical mirror 77, and (c) the focal length of the lens 70, to name a few.

If the lens 70, is tilted about its nodal point, (a nodal point is an imaginary point found for every lens), the focused image position will not move as the lens 70, is tilted. This will allow the continuous observation of the focused spot as the image quality is improved, much like watching a defocused image come in to focus. As the objective 70, is tilted, the laser beam 25, may be observed to identify the point at which the astigmatism is minimized.

Figure 8:
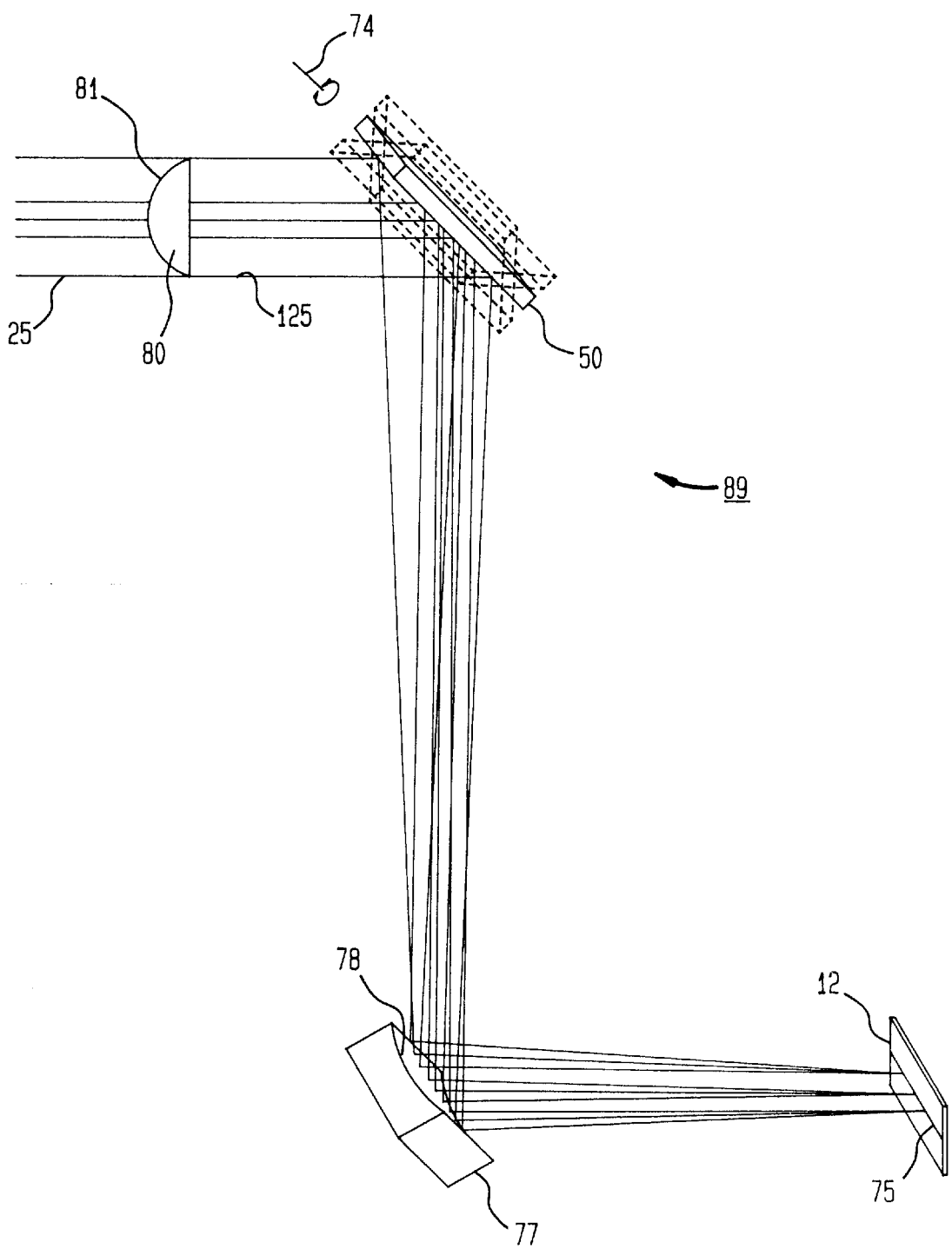
FIG. 8, illustrates another embodiment of the invention using a toric lens.

FIG. 8, illustrates another embodiment of an inventive Mid-Objective Scanner 89, using a toric lens 80. A toric lens is a lens which has a surface having a maximum power in one meridian and a minimum power in a perpendicular meridian. A toric lens is typically used to correct astigmatism. The Mid-Objective Scanner 89, would be a little more expensive to build than the Mid-Objective Scanner 79, because of the toric lens 80, however for some applications it might be desirable to have such a lens. Toric surface 81, of the toric lens 80, should produce the astigmatism that needs to be added or compensated, in order to obtain a flat image or line 75, at the surface of the work-piece 12.

The at least one incoming beam of light 25 or 125, could be a laser beam or it could be a collimated beam of light energy.

This apparatus and process called the Mid-Objective Scanner enables the use of a flat-field Post-Objective Scanner that is free from astigmatism and bow distortion. Additionally, the resulting scanned laser beam is a major improvement over currently available technology.

This invention removes bow distortion, astigmatism, and field curvature. It uses very inexpensive lenses and mirrors. It also provides a telecentric beam, i.e., a beam that when it is scanned the center of the beam is perpendicular to the part at all points along the scan. This invention also produces a scanned line in which the length of the scanned line is directly proportional to the scan angle of the moving surface 50. This is a condition that is strived for in a scanning system which is known as the F-theta condition.

One appropriate use or application for the Mid-Objective Scanner of this invention is to replace the optical scanning system in the MLDS Correction Scheme, which is a correction system invented at IBM Corporation and a subject of U.S. Pat. No. 5,168,454 (LaPlante, et al.), the disclosure of which is incorporated herein by reference. MLDS is a Trade Mark of IBM Corporation, Armonk, N.Y., U.S.A. Because the Mid-Objective Scanner of this invention provides a telecentric lens system the holes that are drilled with the maskless laser drilling system (MLDS) of the above-mentioned U.S. Pat. No. 5,168,454, will all be uniform throughout the scan, i.e., the drilled holes will not have an angle or tilted edge walls as the distance from the center of the scan changes.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An apparatus comprising a Mid-Objective scanner system for correcting astigmatism, bow distortion and field curvature comprising:
   (a) at least one means for tilting at least one lens at an angle alpha to focus at least one incoming light beam onto at least one scanning mechanism, wherein said lens is tilted at said angle alpha to produce an opposite amount of astigmatism to thereby correct astigmatism,
   (b) said scanning mechanism located between said at least one tilted lens and at least one workpiece, wherein said scanning mechanism has at least one means for directing said at least one incoming light beam onto at least a portion of the reflective surface of a concave cylindrical mirror, and
   (c) a means in said concave cylindrical mirror for directing said at least one incoming light beam onto a workpiece, such that said at least one incoming light beam is focused at said workpiece, wherein said concave cylindrical mirror has a radius of curvature which corrects the field curvature in the image plane of said workpiece, and thereby correcting astigmatism, bow distortion and field curvature using a Mid-Objective scanner system.

2. The apparatus of claim 1, wherein said at least one light beam is a laser beam.

3. The apparatus of claim 1, wherein said at least one light beam is a collimated beam of light energy.

4. The apparatus of claim 1, wherein said scanning mechanism is a galvanometer.

5. The apparatus of claim 1, wherein said scanning mechanism is a rotating mirrored polygon.

6. The apparatus of claim 1, wherein said lens is an achromatic lens.

7. The apparatus of claim 1, wherein said lens is tilted about its nodal point.

8. The apparatus of claim 1, wherein the radius of curvature for said concave cylindrical mirror is selected depending upon, (a) the distance between said lens and the scanning surface of said scanning mechanism, (b) the distance between the scanning surface of said scanning mechanism and said reflective surface of said concave cylindrical mirror, and (c) the focal length of said lens.

9. The apparatus of claim 1, wherein said angle alpha of said at least one tilted lens is dependent upon, (a) the resolution of the system, measured by the numerical aperture, (b) the working distance from said reflective surface of said concave cylindrical mirror to said workpiece, (c) the distance between the scanning surface of said scanning mechanism and said reflective surface of said concave cylindrical mirror, (d) the distance between said lens and the scanning surface of said scanning mechanism, and (e) the focal length of said lens.

10. The apparatus of claim 1, wherein said scanning mechanism reflects said incoming light beam at a 90 degree angle.

11. The apparatus of claim 1, wherein said concave cylindrical mirror reflects said incoming light beam at a 90 degree angle.

12. An apparatus comprising a Mid-Objective scanner system for correcting astigmatism, bow distortion and field curvature comprising:
   (a) at least one toric lens to focus at least one incoming light beam onto at least one scanning mechanism, wherein said lens produces an opposite amount of astigmatism to thereby correct astigmatism,
   (b) said scanning mechanism located between said at least one toric lens and at least one workpiece, wherein said scanning mechanism has at least one means for directing said at least one incoming light beam onto at least a portion of the reflective surface of a concave cylindrical mirror, and
   (c) a means in said concave cylindrical mirror for directing said at least one incoming light beam onto said workpiece, such that said at least one incoming light beam is focused at said workpiece, wherein said concave cylindrical mirror has a radius of curvature which corrects the field curvature in the image plane of said workpiece, and thereby correcting astigmatism, bow distortion and field curvature using a Mid-Objective scanner system.

13. The apparatus of claim 12, wherein said at least one light beam is a laser beam.

14. The apparatus of claim 12, wherein said at least one light beam is a collimated beam of light energy.

15. The apparatus of claim 12, wherein said scanning mechanism is a galvanometer.

16. The apparatus of claim 12, wherein said scanning mechanism is a rotating mirrored polygon.

17. The apparatus of claim 12, wherein the radius of curvature for said concave cylindrical mirror is selected depending upon, (a) the distance between said lens and the scanning surface of said scanning mechanism, (b) the distance between the scanning surface of said scanning mechanism and said reflective surface of said concave cylindrical mirror, and (c) the focal length of said lens.

18. The apparatus of claim 12, wherein said scanning mechanism reflects said incoming light beam at a 90 degree angle.

19. The apparatus of claim 12, wherein said concave cylindrical mirror reflects said incoming light beam at a 90 degree angle.

* * * * *